United States Patent
Schempp

(10) Patent No.: US 8,459,233 B2
(45) Date of Patent: Jun. 11, 2013

(54) METHOD FOR OPERATING AT LEAST ONE INJECTOR OF AN INTERNAL COMBUSTION ENGINE

(75) Inventor: Stefan Schempp, Wernau (DE)

(73) Assignee: Robert Bosch GmbH, Stuttgart (DE)

( * ) Notice: Subject to any disclaimer, the term of this patent is extended or adjusted under 35 U.S.C. 154(b) by 380 days.

(21) Appl. No.: 12/962,219

(22) Filed: Dec. 7, 2010

(65) Prior Publication Data

US 2011/0139124 A1    Jun. 16, 2011

(30) Foreign Application Priority Data

Dec. 10, 2009 (DE) .......................... 10 2009 054 470

(51) Int. Cl.
*F02M 51/00* (2006.01)

(52) U.S. Cl.
USPC .............................. 123/478; 137/482; 261/38

(58) Field of Classification Search
USPC ............. 123/339.14, 478, 480, 490; 701/104, 701/105, 110; 239/585.1, 585.2; 251/129.01, 251/129.06; 310/317; 361/152–154
See application file for complete search history.

(56) References Cited

U.S. PATENT DOCUMENTS

| | | | | |
|---|---|---|---|---|
| 3,720,193 | A * | 3/1973 | Monpetit | 123/477 |
| 4,749,897 | A * | 6/1988 | Natsume et al. | 310/317 |
| 5,495,415 | A * | 2/1996 | Ribbens et al. | 701/111 |
| 5,535,621 | A * | 7/1996 | Glidewell et al. | 73/114.49 |
| 6,619,268 | B2 * | 9/2003 | Rueger et al. | 123/490 |
| 7,607,336 | B2 * | 10/2009 | Sutter et al. | 73/1.74 |

FOREIGN PATENT DOCUMENTS

DE    103 15 815    10/2004

* cited by examiner

*Primary Examiner* — Stephen K Cronin
*Assistant Examiner* — Carl Staubach
(74) *Attorney, Agent, or Firm* — Kenyon & Kenyon LLP

(57) ABSTRACT

A method for operating at least one injector of an internal combustion engine, in which a voltage applied to the injector is varied, and a rotational speed pattern of the internal combustion engine is ascertained as a function of the voltage, a setpoint voltage, suitable for operating the at least one injector, corresponding to that varied applied voltage for which a peak arises in a spectrum of the rotational speed pattern.

10 Claims, 3 Drawing Sheets

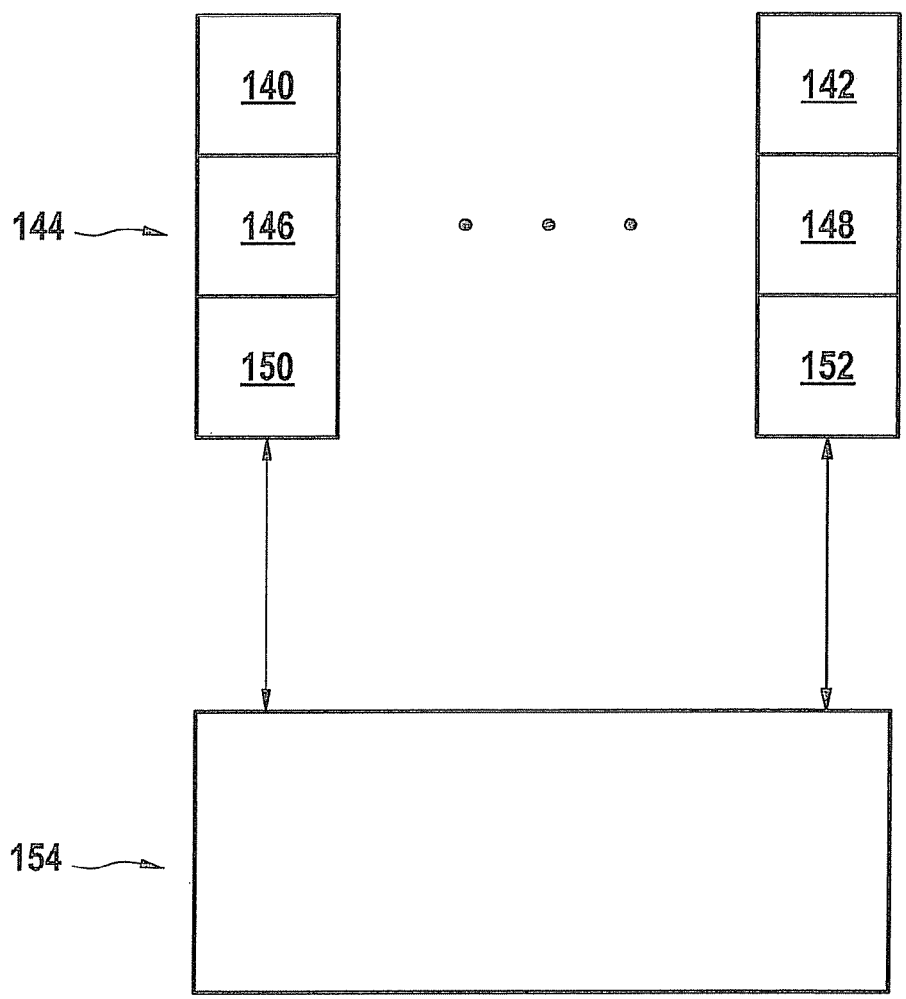

METHOD FOR OPERATING AT LEAST ONE INJECTOR OF AN INTERNAL COMBUSTION ENGINE

RELATED APPLICATION INFORMATION

The present application claims priority to and the benefit of German patent application no. 10 2009 054 470.4, which was filed in Germany on Dec. 10, 2009, the disclosure of which is incorporated herein by reference.

FIELD OF THE INVENTION

The present invention relates to a method and a configuration for operating at least one injector of an internal combustion engine.

BACKGROUND INFORMATION

Common rail injectors are injection systems for internal combustion engines, which operate according to the storage injection principle, using a common high-pressure fuel storage for all cylinders of an internal combustion engine. Piezoelectric actuators and piezoelectric controllers, for example, CRI3.1, CRI3.2, CRI3.3 from Robert Bosch GmbH having various functions, are used for operating an injector. One object of these functions is to minimize the tolerances throughout one exemplar and one service life of the injection system.

The IVA (injector voltage adjustment) is provided ex factory as a first function for equalizing the voltage of various injectors. For this function, the voltage demand of each injector is measured at the time of its manufacture and is stored in the EEPROM of a control unit at the time of installation for controlling the injection system via a code, defining the so-called IVA class.

With regard to the second function, the NVC (nominal voltage calibration) is taken into account for equalizing the drift in the voltage demand over the service life.

A method for ascertaining the triggering voltage of a piezoelectric element is known from DE 103 15 815 A1. In this method, a voltage drop is detected on the piezoelectric element after a charging operation. The triggering voltage of the piezoelectric element is determined from this voltage drop.

SUMMARY OF THE INVENTION

Against this background, a method and a configuration having the features of the method and system described herein are presented. Embodiments are derived from the further configurations and descriptions herein.

A voltage compensation for equalizing service life-dependent drifts and deviations of injectors, for example, piezoelectric injectors and thus injectors controlled by piezoelectric actuators, is achievable with the exemplary embodiments and/or exemplary methods of the present invention. As soon as a suitable optimal setpoint voltage is ascertained by variation of a characteristic voltage, which is provided for triggering an injector, the injector, for example, a piezoelectric actuator of the injector, may be triggered by this setpoint voltage during operation.

Within the scope of the exemplary embodiments and/or exemplary methods of the present invention, a function which may be used for various purposes is provided for calibration of the voltage and thus the setpoint voltage as well as for rapid learning during idling. As an alternative to NVC, it is thus possible to equalize the drift in the voltage demand over the service life, also during operation, if necessary. In addition, after replacement of an injector, a plausibility check may be performed on the programmed IVA class in the event service is required, to thus meet the requirements of the California Air Resources Board (CARB) or for on-board diagnosis (OBD). The exemplary embodiments and/or exemplary methods of the present invention also offers an alternative to measurement of the IVA in the factory.

In one embodiment of this method, a characteristic voltage or a trigger voltage of the torque-producing injections, which is usually provided for triggering, is varied for a selected injector. This voltage is usually reduced continuously until it drops below the function limit of the injector. In one specific embodiment of the present invention, this occurs only in every other load cycle in the case of pilot injections on a selected cylinder. The voltage demand of each injector is then measured from the resulting peak in the spectrum of the rotational speed and thus the rotational speed pattern. A voltage for triggering the injector thus correlates with the peak ascertained here. This voltage corresponds to the setpoint voltage suitable for operating the injector, which usually cooperates with a piezoelectric actuator.

In contrast with the NVC, the function provided within the scope of the present invention may be used to accompany operation, typically in each idling phase of the internal combustion engine, automatically, for example, according to defined time intervals. If the voltage thereby ascertained deviates from a previous characteristic voltage for triggering, a readjustment of the voltage may also be performed dynamically and/or to accompany operation. However, the NVC usually functions only with injectors having a second lift stop of the switching valve in the opened state. In addition, the compensation function provided in this embodiment of the present invention may also be used with injectors which do not have the second lift stop because in these cases, among others, the direct quantitative effect of the triggering may be utilized instead of the remeasured trigger voltage.

The configuration described here is designed to perform all the steps of the method presented. Individual steps of this method may also be performed by individual components of the configuration. In addition, functions of the configuration or functions of the individual components of the configuration may also be implemented as steps of the method. Furthermore, it is possible for steps of the method to be implemented as functions of individual components of the configuration or of the configuration as a whole.

Additional advantages and embodiments of the present invention are derived from the description and the accompanying drawings.

It is self-evident that the features mentioned above and those yet to be described below may be used not only in the particular combination indicated but also in other combinations or alone without going beyond the scope of the present invention.

BRIEF DESCRIPTION OF THE DRAWINGS

FIG. 7 shows a schematic illustration of components of an internal combustion engine as well as a specific embodiment of a configuration according to the present invention.

DETAILED DESCRIPTION

Figure 1:
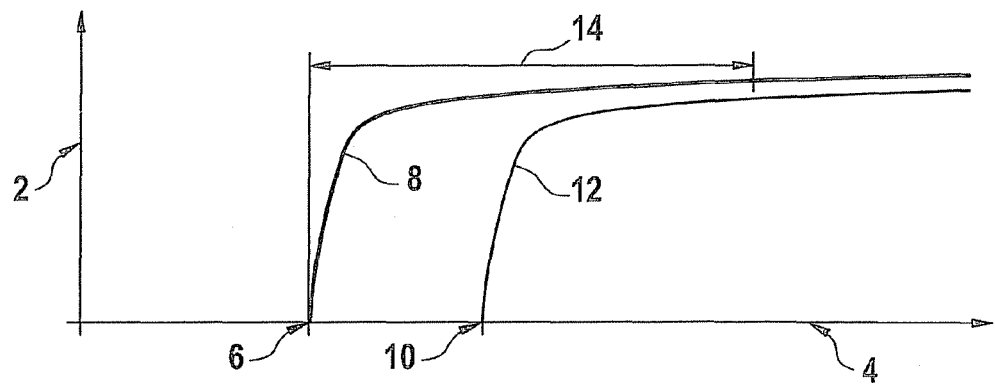
FIG. 1 shows a diagram representing a voltage demand characteristic curve for determining an IVA class.

The exemplary embodiments and/or exemplary methods of the present invention is illustrated schematically in the drawings on the basis of specific embodiments and is described in greater detail below with reference to the drawings.

The figures are described in summary and in comprehensive form using the same reference numerals denoting the same components.

In the diagram in FIG. 1, an injection quantity of an injector is plotted along a vertical axis 2 over a horizontal axis 4 for the voltage, which is applied to an injector. In addition, this diagram shows qualitatively the influence of the voltage provided for triggering on the injection quantity for a certain rail pressure. The measure for establishing an IVA class is represented as an example by characteristic voltage $U_{char,1}$ 6 for a first IVA class (curve 8) and characteristic voltage $U_{char,2}$ 10 for a second IVA class (curve 12). The injector is then triggered by a rail pressure-dependent voltage $U(p_{Rail}) = U_{char} + U_{Offset}$, where $U_{Offset}$ 14 represents a constant voltage offset.

Figure 2:
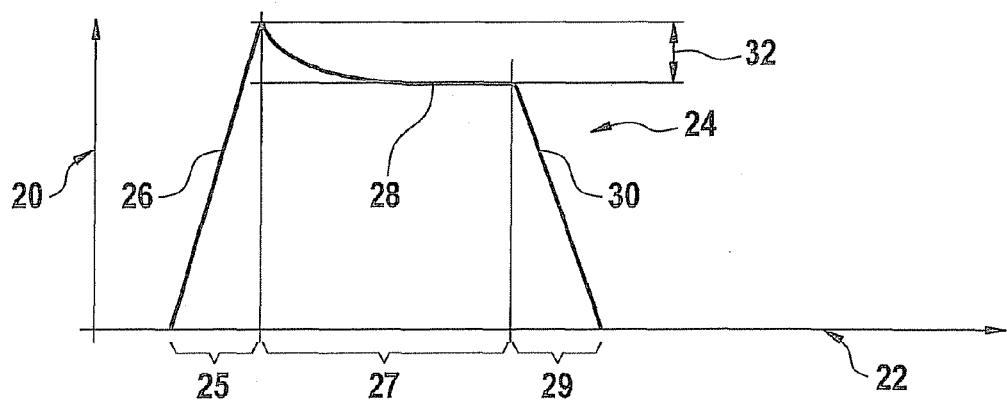
FIG. 2 shows a diagram of a course of a trigger voltage for a piezoelectric actuator of an injector.

The diagram in FIG. 2 shows a voltage applied to an injector, here a piezoelectric actuator of an injector during an injection operation, and provided for triggering the injector, plotted along a vertical axis 20 over a horizontal axis 22 for time. A curve 24 of this voltage or trigger voltage includes a charging phase 26 of the injector during a first time interval 25, a holding phase 28 of the injector during a second time interval 27, and a discharge phase 30 of the injector during a third time interval 29. Voltage difference ΔU 32 between the voltage shortly after charging and the voltage shortly before discharging corresponds to a preset value, which depends on the rail pressure. If this preset value is not met, then in performing an NVC (nominal voltage calibration function), the setpoint voltage shortly before discharging is varied until the correct voltage difference ΔU 32 has been established. The service life-dependent drift of the injector is equalized through this compensation mechanism.

The pattern of voltage difference ΔU 32 is subject to many influences, which may result in failure of the NVC. It is possible to ensure that such influences are reduced by enabling learning in certain regions in the operating space of the injection system, usually including at least one injector.

Figure 3:
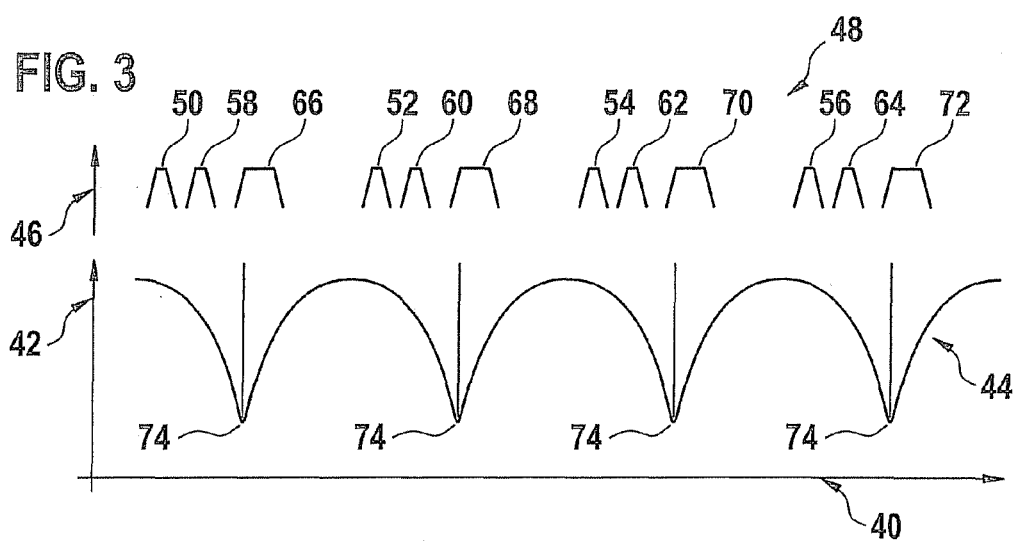
FIG. 3 shows a diagram representing the course of a trigger voltage and of a rotational speed pattern.

The diagram in FIG. 3 has a horizontal axis 40 for time. A rotational speed pattern n 44 is plotted here along a first lower vertical axis 42. Voltage U provided for triggering the injector is plotted here along a second upper vertical axis 46 in synchronization.

By triggering the injectors with voltage U for triggering, this yields approximately injection characteristic 48 shown in the diagram in FIG. 3 and, from this, characteristic rotational speed pattern n 44. A load cycle of a 4-cylinder engine having two crankshaft rotations or one camshaft rotation is illustrated here. In detail, injection characteristic 48 includes two pilot injections Pil2 50, Pil1 58 and one main injection MI 66 for a first cylinder, two pilot injections Pil2 52, Pil1 60 and one main injection MI 68 for a second cylinder, two pilot injections Pil2 54, Pil1 62 and one main injection MI 70 for a third cylinder, and two pilot injections Pil2 56, Pil1 64 and one main injection MI 72 for, a fourth cylinder. Rotational speed pattern n 44 has one minimum 74 at each of the top dead centers (TDC) of a position of the crankshaft of the internal combustion engine.

In this embodiment, it is provided that for implementing the exemplary embodiments and/or exemplary methods of the present invention, all functions which influence the uniformity of engine rotation in idling, for example, idle speed control (ISC), fuel balance control (FBC), zero quantity calibration (ZQC), etc., are already adjusted and switched to inactive during the learning phase of drift compensation for the voltage demand.

Figure 4:
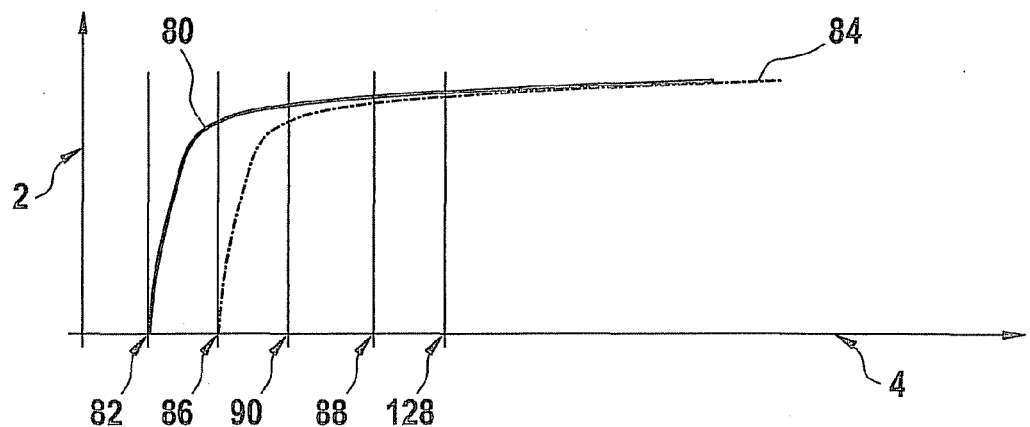
FIG. 4 shows a diagram for displacement of the voltage point during learning, which is provided within the scope of a specific embodiment of the method according to the present invention.

The diagram shown in FIG. 4, like the diagram in FIG. 1, has a vertical axis 2 for the injection quantity and a horizontal axis 4 for the voltage. The learning of the voltage drift begins with first cylinder 1, for example. First injector 1 shows ex factory solid-line curve 80 illustrated in the diagram in FIG. 4 having original characteristic voltage $U_{char,u}$ 82, which has admittedly drifted slightly toward higher voltage values due to its service life, for example, which is represented here by a drifted dash-dot curve 84 having a drifted characteristic voltage $U_{char,d}$ 86. An original voltage $U_{AP,1}$ 88 corresponding to the operating point thus results in only minor effects on the quantity of fuel injected due to the drift. However, the trigger voltage provided for triggering is closer to the function limit of the injector and is thus less robust with respect to disturbances.

The learning, which is provided as part of the present method, takes place via a shift in the operating point of the selected injector. Instead of being triggered by the voltage or setpoint voltage $U_{Ap,1}$ 88, which is already set originally, for one operating point, the injector is triggered in the learning phase by a reduced voltage $U'_{AP}$ 90 for the operating point for a few load cycles of the internal combustion engine. In doing so, lower voltage $U'_{AP}$ 90 is used only with every other camshaft rotation.

Figure 5:
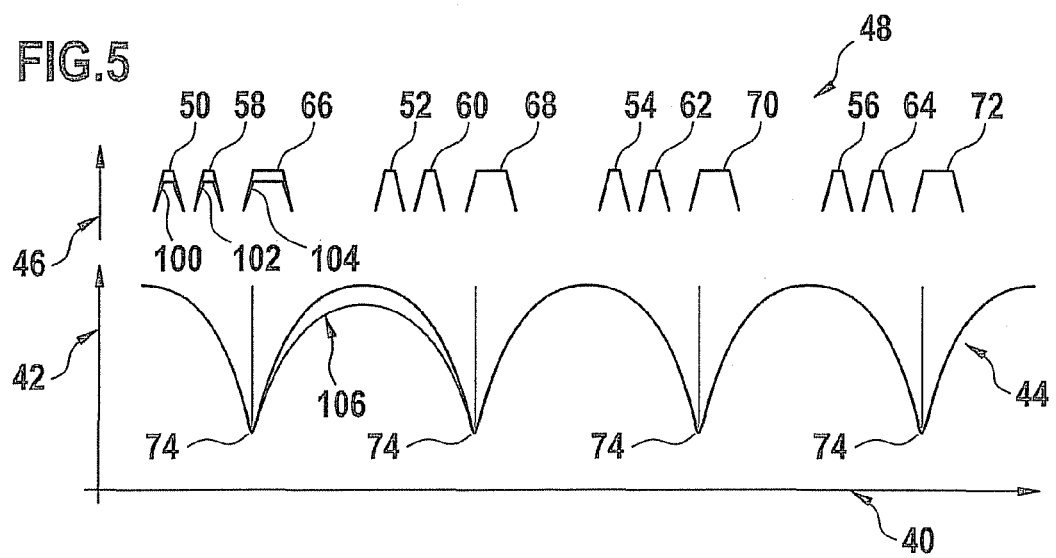
FIG. 5 shows a diagram to illustrate an effect of a learning intervention on the rotational speed pattern in another specific embodiment of the method according to the present invention.

The diagram in FIG. 5 is structured like the diagram in FIG. 3 and includes a horizontal axis 40 for time and a first vertical axis 42 for rotational speed pattern n 44 and a second vertical axis 46 for voltage U. A feedback effect on the torque of the internal combustion engine and thus on rotational speed pattern n 44, which is thereby reduced, is obtained via the quantitative effect of the reduced voltage, which is provided for triggering the injector. This is shown in FIG. 5 only for the first cylinder as a function of reduced pilot injections Pil2 100, Pil1 102, a reduced main injection MI 104 and a resulting reduced rotational speed pattern n 106 between the first two minimums 74 shown.

Due to the lower torque, the combustion-induced increase in rotational speed on the particular cylinder also does not turn out to be as great (reduced rotational speed pattern n 106).

This is manifested in the spectrum of the rotational speed or rotational speed signal as a peak at a frequency, which typically corresponds to half the camshaft rotational speed.

Figure 6:
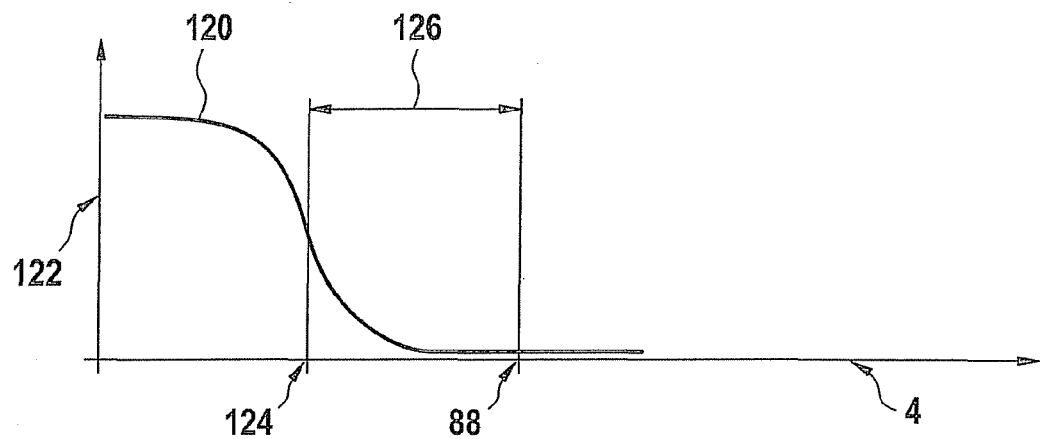
FIG. 6 shows a diagram of the height of a characteristic peak as a function of the trigger voltage.

The diagram in FIG. 6 shows a peak height 120 of a Fourier transform of the rotational speed signal plotted along a vertical axis 122 over trigger voltage $U'_{AP}$, which is usually reduced for the operating point during the execution of the method, plotted along a horizontal axis 4. To provide the diagram in FIG. 6, the Fourier transform is performed from the time characteristic of a rotational speed pattern n 44, which is shown in FIG. 5, for example, and thus provides a spectrum of the rotational speed pattern.

In one embodiment of the present invention, only every other load cycle is used to reduce the voltage or to adjust reduced voltage $U'_{AP}$. As a result, a separation of exemplar-dependent effects, which are visible in the spectrum at half the camshaft rotational speed, may be achieved in the frequency spectrum. Peak height 120 is a direct measure of the distance of the value for setpoint voltage $U_{AP,1}$ 88 from voltage $U_F$ 124 for the function limit. The characteristic curve of peak height 120 shown in the diagram in FIG. 6 is obtained qualitatively with a voltage difference $\Delta U_F$ 126. In one embodiment of the present invention, peak height 120 for the camshaft rotational speed or a corresponding camshaft signal may vary.

In this way, the distance of voltage $U'_{AP}$ from the function limit of the injector, this distance being set by variation during the method for a current operating point, may be ascertained using voltage difference $\Delta U_F$ 126. This distance is then kept constant, which results in the fact that in the case of the drifted injector, as shown in the diagram in FIG. 4, the correct operating point is shifted to a new voltage or setpoint voltage $U_{AP,1,new}$ 128, which may be used for triggering the injector for further operation of the injector.

FIG. 7 shows a first cylinder 140 and an nth cylinder 142 of an internal combustion engine 144 in a schematic representation. Within this internal combustion engine 144, one injector 146, 148 is assigned to each of aforementioned cylinders 140, 142. Injectors 146, 148 shown here form components of a so-called common rail system for implementing a storage injection of cylinders 140, 142 of internal combustion engine 144. During operation of internal combustion engine 144, injectors 146, 148 are opened and closed by particular piezoelectric actuators 150, 152 for implementing injection operations for cylinders 140, 142. The operation of injectors 146, 148 and particular piezoelectric actuators 150, 152 is controlled and/or regulated by a specific embodiment of a configuration 154 according to the exemplary embodiments and/or exemplary methods of the present invention. It is provided here that information is exchanged between configuration 154 and a cylinder 140, 142 having an assigned injector 146, 148 and a particular piezoelectric actuator 150, 152. It is thus possible to monitor a function of the aforementioned components of internal combustion engine 144, i.e., of cylinders 140, 142, injectors 146, 148 and piezoelectric actuators 150, 152.

Configuration 154 is also designed to apply voltages to piezoelectric actuators 150, 152 and thus to injectors 146, 148, as shown in the diagrams in FIGS. 2, 3, 5, for example. Dimensions of piezoelectric actuators 150, 152 are altered dynamically by the applied voltages and the assigned injectors 146, 148 are thereby opened and closed.

During a longer operating time of the components of internal combustion engine 144 described here, changes in setpoint operating parameters, which are originally set ex factory, may result. This may pertain to the setpoint voltages, among other things, which are provided to trigger piezoelectric actuators 150, 152.

In one possible implementation of the method according to the present invention by the specific embodiment of configuration 154 according to the present invention as shown here, operation-induced deviations in the setpoint voltages originally provided are corrected and new operation-favorable setpoint voltages are set.

The voltage applied to a piezoelectric actuator 150, 152, for example, during idling of internal combustion engine 144, is varied for one operating point, and a rotational speed pattern of internal combustion engine 144 is ascertained as a function of this varied voltage. This yields a peak in a spectrum of the rotational speed pattern. A voltage ascertained within the scope of the method, which is assigned to the aforementioned peak, may then be used as a future setpoint voltage for an injector 146, 148, typically for a piezoelectric actuator 150, 152 during normal operation of internal combustion engine 144.

All the specific embodiments of the present invention shown here have in common the fact that for performing the method for at least one injector 146, 148 of internal combustion engine 144, a voltage 6, 10, 82, 86, 90, 124 applied to injector 146, 148 is varied and a rotational speed pattern 44, 106 of internal combustion engine 144 is ascertained as a function of voltage 6, 10, 82, 86, 90, 124. A setpoint voltage 88, 128 suitable for operating the at least one injector 146, 148 corresponds to that varied applied voltage 6, 10, 82, 86, 90, 124 for which a peak arises in a spectrum of rotational speed pattern 44, 106. To do so, voltage 6, 10, 82, 86, 90, 124 is usually varied for one operating point. The specific embodiment of configuration 154 according to the present invention, as shown in FIG. 7, is designed for performing a specific embodiment of the method according to the present invention, for example.

In addition, it is provided in one specific embodiment that an actuator is assigned to injector 146, 148, the actuator optionally also being designed as a component of injector 146, 148. Such an actuator is designed to open and close injector 146, 148. Voltage 6, 10, 82, 86, 90, 124 provided for this purpose for operating injector 146, 148 is to be applied here to the actuator and thus indirectly to injector 146, 148. In this specific embodiment, voltage 6, 10, 82, 86, 90, 124 applied to the actuator is then typically varied for one operating point. Piezoelectric actuators 150, 152, among others, are suitable as the actuators.

What is claimed is:

1. A method for operating at least one injector of an internal combustion engine, the method comprising:
varying a voltage that is applied to the at least one injector; and
ascertaining a rotational speed pattern of the internal combustion engine as a function of the voltage;
wherein a setpoint voltage suitable for operating the at least one injector corresponds to that varied applied voltage, for which a peak arises in a spectrum of the rotational speed pattern.

2. The method of claim 1, wherein the voltage is varied for one operating point.

3. The method of claim 1, wherein a piezoelectric actuator is assigned to the at least one injector, and wherein the voltage applied to the piezoelectric actuator is varied and the suitable setpoint voltage is ascertained therefrom.

4. The method of claim 2, wherein the voltage for the operating point is reduced, starting from an increased value of the voltage until a voltage for a function limit of the injector is reached.

5. The method of claim 2, wherein the distance of a value of the setpoint voltage suitable for the operating point from the function limit is determined via a height of the peak.

6. The method of claim 1, wherein the operations are performed during idling of the internal combustion engine.

7. The method of claim 1, wherein a voltage, which is provided for triggering the at least one injector, is ascertained as the setpoint voltage.

8. The method of claim 1, wherein the setpoint voltage is ascertained individually for each injector of the internal combustion engine, and wherein at least one injector is assigned to each cylinder of the internal combustion engine.

9. The method of claim 1, wherein the voltage is varied in every other load cycle of the internal combustion engine.

10. A configuration for operating at least one injector of an internal combustion engine, comprising:
- a varying arrangement to vary a voltage that is applied to the at least one injector; and
- an ascertaining arrangement to ascertain a rotational speed pattern of the internal combustion engine as a function of the voltage;
- wherein a setpoint voltage suitable for operating the at least one injector corresponds to that varied applied voltage, for which a peak arises in a spectrum of the rotational speed pattern.

* * * * *